United States Patent [19]
Jeričević

[11] Patent Number: 5,864,786
[45] Date of Patent: Jan. 26, 1999

[54] APPROXIMATE SOLUTION OF DENSE LINEAR SYSTEMS

[75] Inventor: Željko Jeričević, Houston, Tex.

[73] Assignee: Western Atlas International, Inc., Houston, Tex.

[21] Appl. No.: 980,743

[22] Filed: Dec. 1, 1997

[51] Int. Cl.$^6$ .................................................. G06F 15/347
[52] U.S. Cl. .................... 702/189; 364/735; 364/725.01; 364/726.01; 364/754.02; 395/800.11; 702/196
[58] Field of Search ..................................... 702/189, 196; 364/725.01, 726.01, 726.02, 726.03, 754.02, 578, 735, 736.03; 395/800.11

[56] References Cited

U.S. PATENT DOCUMENTS

| | | | |
|---|---|---|---|
| 5,253,192 | 10/1993 | Tufts | 364/726.01 |
| 5,301,342 | 4/1994 | Scott | 364/735 |
| 5,442,569 | 8/1995 | Osano | 364/578 |
| 5,703,799 | 12/1997 | Ohta | 364/725.01 |

*Primary Examiner*—John Barlow
*Assistant Examiner*—Hien Vo
*Attorney, Agent, or Firm*—E. Eugene Thigpen

[57] ABSTRACT

A physical signal is represented by a linear system. The linear system is transformed from the time and space domain to the frequency domain, generating a transformed system. The least significant portions in the transformed system are determined. The least significant portions are deleted from the transformed system, generating a smaller pruned system. The pruned system is solved in the frequency domain, generating a solution. The solution is inverse transformed from the frequency domain to the time and space domain, generating an approximation to the physical signal.

12 Claims, 3 Drawing Sheets

APPROXIMATE SOLUTION OF DENSE LINEAR SYSTEMS

BACKGROUND OF THE INVENTION

1. Field of the Invention

The present invention relates generally to signal processing and, more particularly, to a method for more efficiently approximating a physical signal representing a linear or locally linearized system.

2. Description of the Related Art

Physical signals or measurements in space and time dimensions are typically represented in digital form as vectors. Constructing a physical model of these physical signals is then typically represented by solving linear systems of equations in matrix form which involve these vectors. The problem is expressed as solving a set of linear equations, given in matrix form as $$y=Ax. \qquad (1)$$

Here y is a column vector of size m representing a set of known values, A is a known matrix of size mxn, that is, m rows by n columns, and x is a column vector of size n. The vector x represents the solution of the above system.

An alternative expression for the above physical signal is the eigenvalue problem. This problem involves finding the eigenvalues and eigenvectors of a matrix B, expressed in matrix form as $$Bq_i=\lambda_i q_i. \qquad (2)$$

Here B is a square matrix, $\lambda_i$ is the i'th eigenvalue of matrix B and $q_i$ is the associated i'th eigenvector of matrix B.

If the digital data representing the physical signal is voluminous, then the linear system is going to be large. The number of rows m in the matrix, typically representing the number of measurements, will be large. A system for which mn is called overdetermined. If the number of variables representing the physical model describing the physical signal is large, then the linear system is going to be large. The number of columns n in the matrix, typically representing the parameters of the physical model utilized, will be large. A system for which nm is called underdetermined. If both conditions apply, then both the number of rows and columns in the matrix equations are going to be large. In addition, the matrices may be dense or ill-conditioned. All of these conditions make the matrix equations representing the physical model of the signal difficult to solve.

G. Beylkin et al., "Fast Wavelet Transform and Numerical Algorithms I", Communications for Pure and Applied Mathematics, Vol. XLIV, pp. 141–183, 1991, disclose a method for the conversion of dense matrices into sparse matrices using a wavelet transform. However, the size of the matrices is not diminished.

Thus a method for the approximate solution of large, dense linear systems representing the system of linear equations is desired. An approximate solution for large or ill conditioned systems which otherwise defy classical approaches like a singular value decomposition is needed. In particular, a method which can efficiently decrease the size of either the column dimension, the row dimension, or both simultaneously, while still yielding a good approximation to solving the linear system would be useful.

SUMMARY OF THE INVENTION

A physical signal is represented by a linear system. The linear system is transformed from the time or space domain to the frequency domain, generating a transformed system. The least significant portions in the transformed system are determined. The least significant portions are deleted from the transformed system, generating a smaller pruned system. The solution for the pruned system is computed in the frequency domain. The solution is inverse transformed from the frequency domain to the time or space domain, yielding an approximation to the solution of the system describing the physical signal.

BRIEF DESCRIPTION OF THE DRAWINGS

A better understanding of the benefits and advantages of the present invention may be obtained from the appended detailed description and drawing figures, wherein.

DESCRIPTION OF THE PREFERRED EMBODIMENTS

Figure 1:
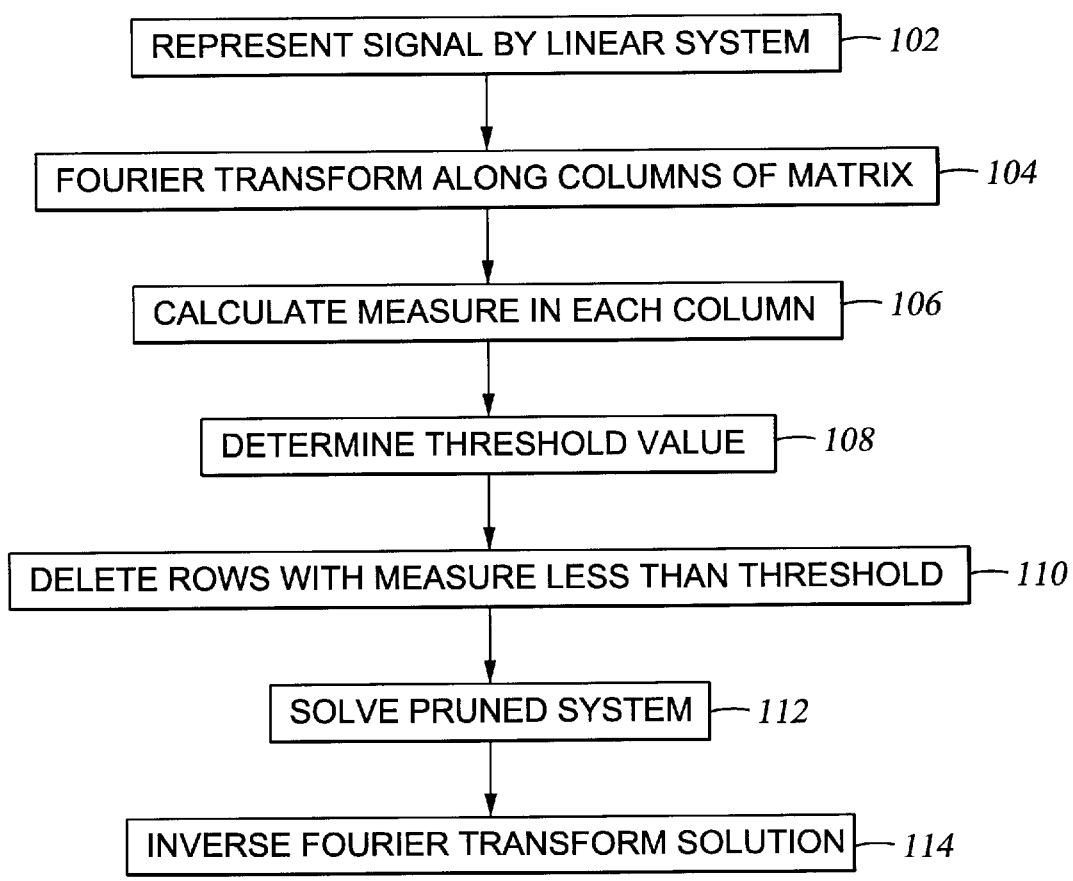
FIG. 1 is a schematic diagram of the method of the present invention for approximating a physical signal by solving an overdetermined linear system representing the physical model of the physical signal.

The present invention comprises the steps of transforming a linear system using the Fourier or Hartley transforms, discarding the least significant portions of the transformed system and solving a reduced size problem in the transform space. An approximate solution to the linear system in the Fourier domain may be constructed by using a limited bandwidth in the Fourier domain. The result is then inverse transformed to give an approximate solution in the time or space domain.

Applying a Fourier transform to Eq. (1) is formally done by premultiplying both sides with the Fourier matrix F, yielding $$Fy=FAx. \qquad (3)$$

The product Fy is the Fourier transform of vector y and is denoted as $\{y\}$ below, while the matrix product FA is the Fourier transform along the columns of matrix A and is denoted $\{A\}_c$ below. Thus Eq. (3) can be rewritten as $$\{y\}=\{A\}_c x. \qquad (4)$$

The Fourier transform along the rows of matrix A can be developed in a similar fashion. Starting from Eq. (1), $$y=AF^{-1}Fx. \qquad (5)$$

Here $F^{-1}$ is the matrix inverse of the Fourier matrix F, the matrix product $AF^{-1}$ is the inverse Fourier transform along the rows of matrix A and is denoted $\{A\}_R$ below, and Fx is the Fourier transform of vector x and is denoted $\{x\}$ below. Thus Eq. (5) can be rewritten as $$y=\{A\}_R^{-1}\{x\}. \qquad (6)$$

Applying the Fourier transform along the columns in Eq. (6) can be written as premultiplication with the Fourier matrix F $$Fy = F\{A\}_R^{-1}\{x\}. \quad (7)$$

Here the product Fy is the Fourier transform of vector y and is denoted as $\{y\}$ below, the matrix product $F\{A\}_R^{-1}$ is a special two dimensional Fourier transform of matrix A, is denoted as $\{A\}$ below and is taken as a Fourier transform along the columns and an inverse Fourier transform along the rows. Note that the order in which the two dimensional transform is taken is not important. Thus Eq. (7) can also be rewritten as $$\{A\} = F\{A\}_R^{-1} = \{A\}_c F^{-1} = FAF^{-1}. \quad (8)$$

This leads to the following equation, $$\{y\} = \{A\}\{x\}. \quad (9)$$

An equally valid result can be obtained by using $FF^{-1}$ instead of $F^{-1}F$ in Eq. (5), but computationally, $F^{-1}F$ has the advantage because normalization of the Fourier transform can be omitted if the two dimensional transform is used. Omitting the normalization will multiply the singular values of matrix A by the normalization factor, but will not affect the solution of the system.

Using the same approach on the eigenvalue problem given by Eq. (2) yields the following equation $$FBF^{-1}Fq_i = \lambda_i Fq_i. \quad (10)$$

This leads to $$\{B\}\{q_i\} = \lambda_i \{q_i\}, \quad (11)$$

where $\{q_i\}$ is the Fourier transform of the i'th eigenvector $q_i$ associated with the i'th eigenvalue $\lambda_i$ and $\{B\}$ is the two dimensional Fourier transform of matrix B, taken as the Fourier transform along the columns and the inverse Fourier transform along the rows of matrix B.

The approach outlined above may be considered as a preconditioning of matrices A and B. That still leaves a problem of the same order of magnitude as the initial linear system problem. However, the problem is now posed in the frequency domain in which the significance of system orthogonal components, the frequencies, is obvious. Consequently, the system can now be easily manipulated.

For an overdetermined system, that is, where the mxn matrix A has mn, the most appropriate approach is to use Eq. (4) with a Fourier transform along the columns only. In the transform domain, it is now straightforward, by observing the transform magnitudes, to determine which frequencies are the most significant for the reconstruction of vector y. Consequently, Eq. (4) can be solved approximately using only the most significant frequencies present in vector $\{y\}$, preferably the frequencies with the largest magnitude. Alternative measures of significance could be average magnitude or average power. After sorting the magnitudes in $\{y\}$ and determining the threshold, the frequencies below the threshold are not involved in computing the solution of the system. This amounts to discarding the rows in matrix $\{A\}_c$ which do not contribute to significant frequencies in $\{y\}$. Note that the least significant rows are not merely zeroed out, but deleted. Thus the size of the matrix in the linear system to be solved is smaller.

A similar procedure would work for an underdetermined system, that is, where the mxn matrix A has nm. Here the most appropriate approach is to use Eq. (6) with an inverse Fourier transform along the rows only. Then the columns in matrix $\{A\}_R$ which do not contribute to significant frequencies are discarded. For a system which is too large in both dimensions, the most appropriate approach is to use Eq. (9) with a Fourier transform along the columns and an inverse Fourier transform along the rows. Then both rows and columns which do not contribute to significant frequencies may be discarded.

In the case of overdetermined systems which are typical for least squares problems, the transform along the columns and subsequent reduction in number of rows of the transformed matrix may be all that is needed to simplify the computations. In such a case, it is obvious that the wavelet transform can also be used in a similar way, because the scaling and linearity of the applied transform are the only prerequisites for validity of Eq. (4) These types of highly-overdetermined problems are commonly found in oil and gas well logging, such as modeling the response of array induction tools, and geophysical inversion procedures.

The three equations, Eqs. (4), (6) and (9), are equivalent and derived from Eq. (1). The different approaches allow possible simplification or approximation, arising from size reduction, of the original problem. Eq. (4) is most appropriate for overdetermined problems, Eq. (6) for underdetermined problems, and Eq. (9) for problems simply too large in both dimensions. Each frequency in the Fourier domain represents the best approximation in the least squares sense to the original sequence by that particular frequency. Consequently, the approximate solution constructed in the Fourier domain is the least squares approximation of the true solution with the set of chosen frequencies. This can be used to control the accuracy of the approximation. The original form of the problem, Eq. (1), cannot be treated in the same way without perturbing it in an uncontrolled manner.

After transforming to the Fourier domain, the problem of solving the system is still of the same order of complexity. If the linear system started with a real matrix, the problem becomes more complicated because its transform will generally be complex. This complication can be addressed by using the Hartley transform. The complication of dealing with a set of complex equations can be eliminated by converting our equations into the real Hartley transform domain.

FIG. 1 shows a schematic diagram of the method of the present invention for approximating a physical signal by solving an overdetermined linear system representing the physical model of the physical signal. The method is generally designated as 100. A physical model of a physical signal is represented as a linear system, as shown in block 102. The linear system from block 102 is transformed from the time or space domain into the frequency domain using a Fourier transform along the columns of the matrix in the linear system, yielding a transformed system, as shown in block 104. A measure of each element in vector $\{y\}$ or in each column in the transformed matrix in the transformed system from block 104 is calculated, as shown in block 106. The measure is preferably magnitude of the element. A threshold value is determined, as shown in block 108. The rows from the transformed matrix in the transformed system from block 104 whose combinations of measures from block 106 are less than the threshold value from block 108 are deleted, generating the smaller pruned system, as shown in block 110. The preferred combination measure is a sum of the magnitudes. Alternative combination measures are maximum magnitude, average magnitude and average power. The pruned system from block 110 is solved in the frequency domain, generating a solution, as shown in block 112. The solution is inverse transformed from the frequency domain to the time or space domain, generating an approximation to the physical signal, as designated in block 114.

Figure 2:
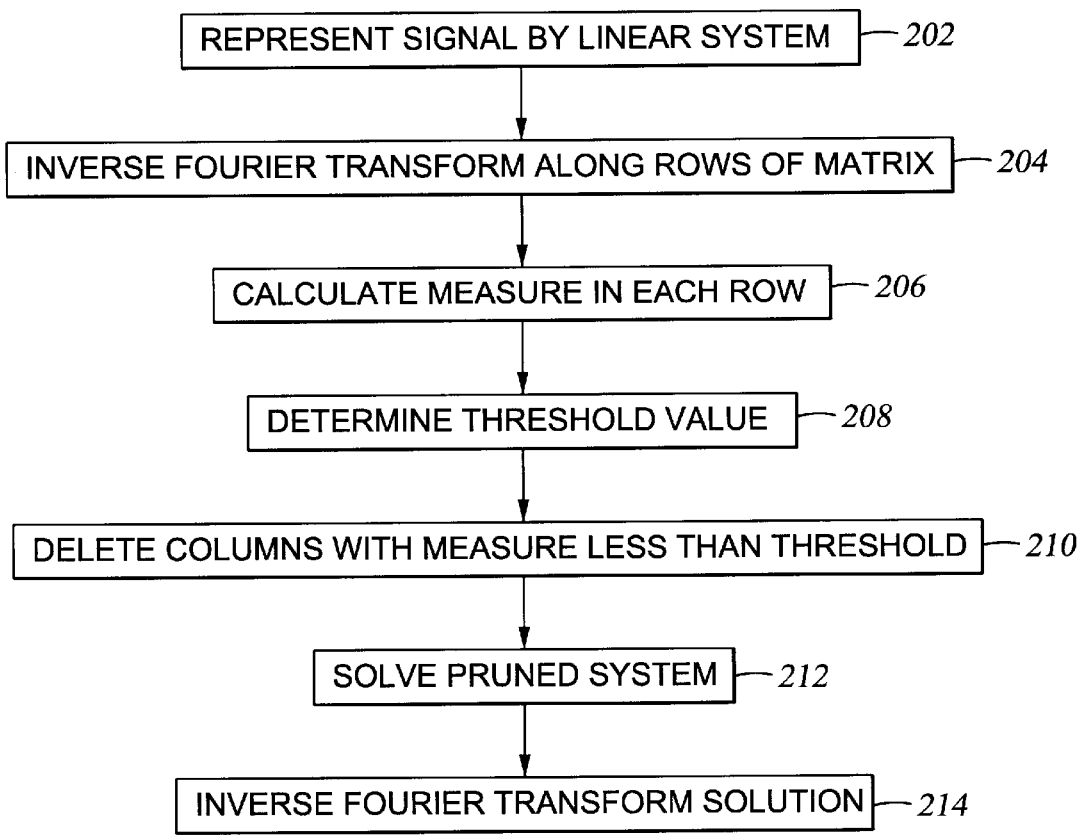
FIG. 2 is a schematic diagram of the method of the present invention for approximating a physical signal by solving an underdetermined linear system representing the physical model of the physical signal.

FIG. 2 shows a schematic diagram of the method of the present invention for approximating a physical signal by solving an underdetermined linear system representing the physical model of the physical signal. The method is generally designated as 200. A physical model of a physical signal is represented as a linear system, as shown in block 202. The linear system from block 202 is transformed from the time or space domain into the frequency domain using an inverse Fourier transform along the rows of the matrix in the linear system, yielding a transformed system, as shown in block 204. A measure of each element in each row in the transformed matrix in the transformed system from block 204 is calculated, as shown in block 206. The measure is preferably magnitude of the element. A threshold value is determined, as shown in block 208. The columns from the transformed matrix in the transformed system from block 204 whose combinations of measures from block 206 are less than the threshold value from block 208 are deleted, generating the smaller pruned system, as shown in block 210. The preferred combination measure is a sum of the magnitudes. Alternative combination measures are maximum magnitude, average magnitude and average power. The pruned system from block 210 is solved in the frequency domain, generating a solution, as shown in block 212. The solution is inverse transformed from the frequency domain to the time domain, generating an approximation to the physical signal, as designated in block 214.

Figure 3:
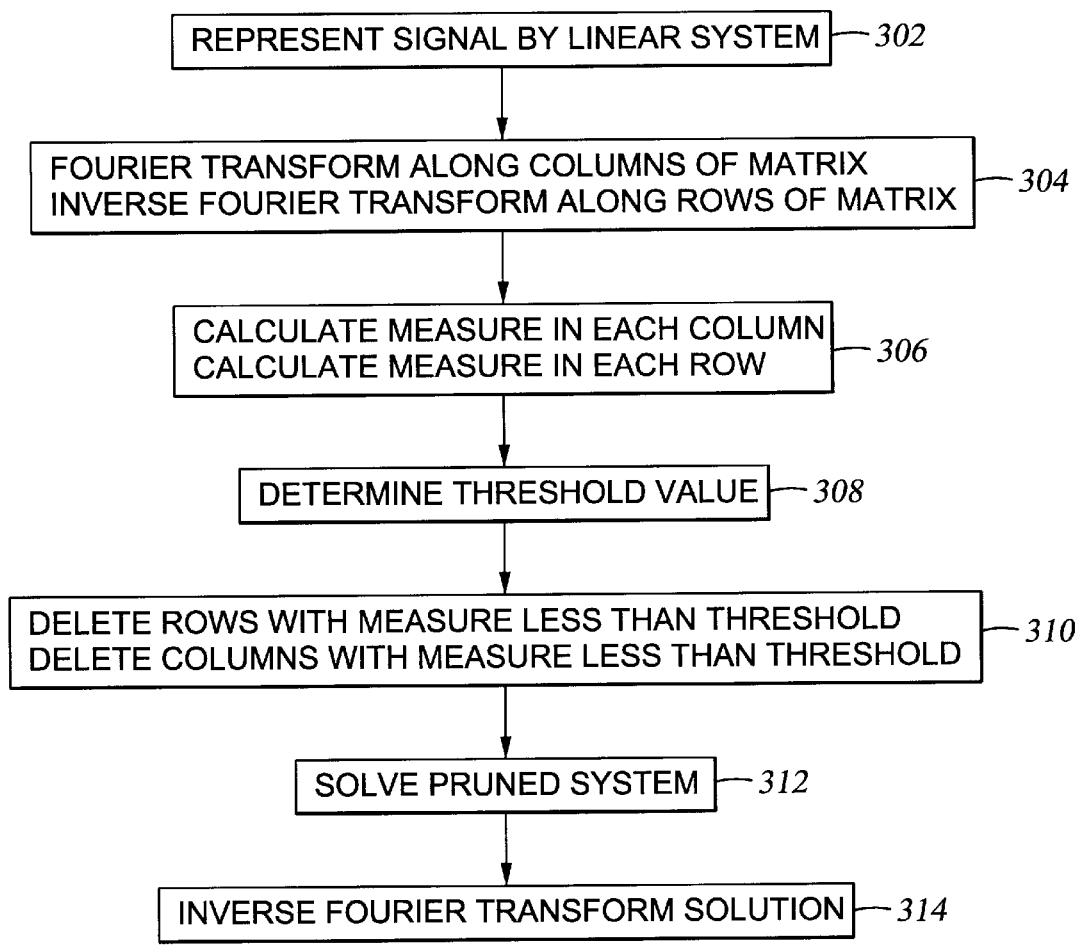
FIG. 3 is a schematic diagram of the method of the present invention for approximating a physical signal by solving a large linear system representing the physical model of the physical signal.

FIG. 3 shows a schematic diagram of the method of the present invention for approximating a physical signal by solving a large linear system representing the physical model of a physical signal. The method is generally designated as 300. A physical model of a physical signal is represented as a linear system, as shown in block 302. The linear system from block 302 is transformed from the time or space domain into the frequency domain using a Fourier transform along the columns of the matrix and an inverse Fourier transform along the rows of the matrix, yielding a transformed system, as shown in block 304. A measure in each column and a measure in each row in the transformed matrix in the transformed system from block 304 is calculated, as shown in block 306. The measure is preferably magnitude of each element. A threshold value is determined, as shown in block 308. The columns and the rows from the transformed matrix in the transformed system from block 304 whose combinations of measures from block 306 are less than the threshold value from block 308 are deleted, generating the smaller pruned system, as shown in block 310. The preferred combination measure is a sum of the magnitudes. Alternative combination measures are maximum magnitude, average magnitude and average power. The pruned system from block 310 is solved in the frequency domain, generating a solution, as shown in block 312. The solution is inverse transformed from the frequency domain to the time domain, generating an approximation to the physical signal, as designated in block 314.

The justification for the whole approach lies in constructing the approximate solution, based not on all, but only on the most significant frequencies. This is similar to filtering in digital signal processing, but applied to the linear algebra problem. The limitation of this filter is in the shape of the filter, which cannot be arbitrary, but has to include whole rows and columns in the frequency domain. By working in the Fourier domain, the size of the matrix will be reduced significantly, if it is feasible. The reduction in size pays off quickly, since the computational problem has an order the size of the matrix dimension to the third power, $O(n^3)$.

The approach outlined above discards whole rows and/or columns from transformed matrix, but it can also be used for constructing the sparse matrix in the transform space out of a dense matrix in the original domain by thresholding according to transform magnitudes. This would keep the size of the problem the same, but will make it sparse as was done previously with the wavelet transform. In particular, diagonally dominant problems will not allow a simple reduction in size, but may allow the approximation of a full sized dense problem by a banded system in the Fourier domain.

It is clear that a unitary transform like the Fourier transform will not change the nature of the problem. If we start with a singular matrix, then its transform will be singular also. However, in the transform domain it may be easier to construct the model system which will have the most significant properties of the original system, but will not be singular. This may be a proper strategy to deal with ill-conditioned problems, namely by constructing an approximate, but stable, solution in the Fourier domain. In this context, discarding rows and/or columns in the transformed matrix may be used to match the size and rank of the matrix.

Our general knowledge of the Fourier transform allows us to estimate feasibility of this approach by observing the overall distribution of values in a matrix. For example, it would be expected that sparse matrices will contain a broadband frequency information, meaning that successful compression in frequency domain may not be possible. In crystallography, the Fourier space is sometimes called reciprocal space, meaning that the broad peak in real space will narrow in the Fourier space. There is a certain amount of flexibility concerning ordering of rows and columns in a matrix, as dictated by linear algebra. By reordering the rows and columns or doing any other allowed linear algebra manipulations prior to taking the transform, the frequency distribution in the Fourier transform of a matrix may be changed to suit our needs. This is not possible in regular signal processing, where the signal is defined as a time or space series.

A particular advantage of the method of the present invention is that computing solutions in transform space does not require construction of new linear algebra routines, but can use existing software for solving the problem in the transform domain.

The present invention has been described with a certain degree of specificity. Variations will occur to those skilled in the art which are within the scope of the invention, which is limited only by the appended claims.

I claim:

1. A method for approximating a model of a recorded physical signal, comprising the steps of:

recording the physical signal as space and time measurements, generating a digital signal;

representing the digital signal by a linear system in a time domain;

transforming the linear system from the time domain to a frequency domain, generating a transformed system;

measuring frequencies in portions of the transformed system;

determining the portions in the transformed system with least significant frequencies;

deleting the determined portions from the transformed system, generating a smaller pruned system;

solving the pruned system in the frequency domain, generating a solution; and inverse transforming the solution from the frequency domain to the time domain, generating a model as an approximation to the physical signal.

2. The method of claim 1, wherein the transform is a Fourier transform.

3. The method of claim 1, wherein the transform is a Hartley transform.

4. The method of claim 2, wherein the Fourier transform is taken along the columns of a matrix in the linear system representing the physical signal.

5. The method of claim 2, wherein the Fourier transform is an inverse Fourier transform taken along the rows of a matrix in the linear system representing the physical signal.

6. The method of claim 2, wherein the Fourier transform is two-dimensional Fourier transform comprising a Fourier transform taken along the columns of a matrix in the linear system representing the physical signal and an inverse Fourier transform taken along the rows of the matrix.

7. The method of claim 4, wherein the measuring, determining and deleting steps comprise the steps of;

selecting a threshold value;

computing a measure of each element in each column in the matrix in the transformed system;

computing a combination of the measures of the elements in each row in the matrix in the transformed system; and deleting the rows from the matrix in the transformed system in which the combinations of measures are less than the threshold value, generating the pruned system.

8. The method of claim 5, wherein the measuring, determining and deleting steps comprise the steps of;

selecting a threshold value;

computing a measure in each row in the matrix in the transformed system;

computing a combination of the measures of the elements in each column in the matrix in the transformed system; and deleting the columns from the matrix in the transformed system in which the combinations of measures are less than the threshold value, generating the pruned system.

9. The method of claim 6, wherein the measuring, determining and deleting steps comprise the steps of;

selecting a threshold value;

computing a measure in each row and in each column in the matrix in the transformed system;

computing a combination of the measures of the elements in each column and in each row in the matrix in the transformed system; and deleting the columns and rows from the matrix in the transformed system in which the combinations of measures are less than the threshold value, generating the pruned system.

10. The method of claim 7, wherein the computing steps comprise the steps of:

calculating the magnitude of each element in each column; and summing the magnitudes of each element in each row.

11. The method of claim 8, wherein the computing steps comprises the steps of:

calculating the magnitude of each element in each row; and summing the magnitudes of each element in each column.

12. The method of claim 9, wherein the computing steps comprise the steps of:

calculating the magnitude of each element in each row and calculating the magnitude of each element in each column; and summing the magnitudes of each element in each column and summing the magnitudes of each element in each row.

* * * * *

UNITED STATES PATENT AND TRADEMARK OFFICE
CERTIFICATE OF CORRECTION

PATENT NO. : 5,864,786
DATED : Jan. 26, 1999
INVENTOR(S) : Zeljko Jericevic

It is certified that error appears in the above-indentified patent and that said Letters Patent is hereby corrected as shown below:

In Column 1, Line 38, first word, delete " mn " and insert:

-- m>n --

In Column 1, Line 43, sixth word, delete "nm " and insert:

-- n>m --

In Column 3, Line 46, fourth word, delete " mn " and insert:

-- m>n --

In Column 3, Line 64, tenth word, delete "nm " and insert:

-- n>m --

Signed and Sealed this

Thirtieth Day of November, 1999

Attest:

Attesting Officer

Q. TODD DICKINSON

Acting Commissioner of Patents and Trademarks